US008961644B2

United States Patent
Burns et al.

(10) Patent No.: US 8,961,644 B2
(45) Date of Patent: Feb. 24, 2015

(54) SEAL DEVICES FOR FILTERS (75) Inventors: David J. Burns, Mineral Wells, TX (US); Daniel M. Cloud, Weatherford, TX (US); Artimus Charles Jones, Benbrook, TX (US); Tyler Glenn Boswell, Weatherford, TX (US)

(73) Assignee: PecoFacet (US), Inc., Franklin, TN (US)

(*) Notice: Subject to any disclaimer, the term of this patent is extended or adjusted under 35 U.S.C. 154(b) by 494 days.

(21) Appl. No.: 13/190,952

(22) Filed: Jul. 26, 2011

(65) Prior Publication Data

US 2013/0025246 A1 Jan. 31, 2013

(51) Int. Cl.
*B01D 46/00* (2006.01)
*B01D 46/24* (2006.01)
*B01D 29/21* (2006.01)
*B01D 29/23* (2006.01)
*B01D 29/52* (2006.01)

(52) U.S. Cl.
CPC ............ *B01D 46/2403* (2013.01); *B01D 29/21* (2013.01); *B01D 29/232* (2013.01); *B01D 29/52* (2013.01); *B01D 2271/027* (2013.01); *B01D 2201/0476* (2013.01); *B01D 2201/295* (2013.01); *B01D 2201/34* (2013.01)
USPC ................... 55/502; 55/484; 55/498; 55/510; 210/450

(58) Field of Classification Search
USPC ................ 55/498, 502, 510, 484; 210/450
See application file for complete search history.

(56) References Cited

U.S. PATENT DOCUMENTS

| | | | |
|---|---|---|---|
| 2,795,195 A | 6/1957 | Amblard et al. | |
| 3,353,678 A | 11/1967 | Dragon | |
| 4,552,669 A | 11/1985 | Sekellick | |
| 4,997,564 A | 3/1991 | Herczeg | |
| 5,128,037 A | 7/1992 | Pearl et al. | |
| 6,168,647 B1 | 1/2001 | Perry, Jr. et al. | |
| 6,224,767 B1 * | 5/2001 | Fujiwara et al. | 210/323.1 |
| 6,764,598 B2 | 7/2004 | Yu et al. | |
| 7,208,088 B2 | 4/2007 | Almasian et al. | |
| 7,285,209 B2 | 10/2007 | Yu et al. | |
| 7,294,163 B1 | 11/2007 | LaCroix | |
| 7,410,581 B2 | 8/2008 | Arnold et al. | |
| 8,153,000 B2 * | 4/2012 | Schmitt | 210/232 |
| 2005/0229563 A1 * | 10/2005 | Holzmann et al. | 55/502 |
| 2006/0065601 A1 | 3/2006 | Baird | |
| 2008/0041026 A1 | 2/2008 | Engel et al. | |
| 2009/0107905 A1 | 4/2009 | Schmitt | |
| 2010/0000934 A1 | 1/2010 | Brown | |
| 2010/0294712 A1 | 11/2010 | Abdalla et al. | |
| 2012/0210688 A1 * | 8/2012 | Burns et al. | 55/483 |

* cited by examiner

*Primary Examiner* — Robert Clemente
(74) *Attorney, Agent, or Firm* — Reinhart Boerner Van Deuren P.C.

(57) ABSTRACT

A filter element having an end cap is provided with a seal that can better accommodate non-round holes. The seal may be a chevron type seal and/or other similar seal having a sealing flange for forming a radial seal. Methods of replacing a filter having an O-ring gasket to improve upon sealing are provided as well as filtration systems employing the filter element.

15 Claims, 8 Drawing Sheets

SEAL DEVICES FOR FILTERS

FIELD OF THE INVENTION

This invention generally relates to filters, and in particular to filters having seals, and methods for installing the same.

BACKGROUND OF THE INVENTION

Fluid streams such as liquid flows and gaseous flows (e.g. air flows) often carry particulates that are often undesirable contaminants entrained in the fluid stream. Filters are commonly employed to remove some or all of the particulates from the fluid stream.

Seals such as o-rings are often provided to seal the filter to a surface of a filter housing, or to an inlet or outlet pipe, which carries the contaminated fluid or gas into or out of the filter. This sealing relationship helps prevent unfiltered fluid from bypassing the filter. Often, an imperfectly manufactured filter housing or pipe will have a sealing surface that is out of round or out of tolerance, thus making it more difficult for the seal to provide a full sealing relationship, and increasing the likelihood that contaminated fluid can bypass the filter. As such, filter housing makers will often attempt to tightly tolerance their sealing surfaces on housings. However, if that is not done, then a problem exists as typical O-ring gaskets can have sealing problems and therefore allow some leakage if the sealing surface is even 0.0005 inches out of round, or has an actual diameter even 0.010 greater than a design diameter. O-ring gaskets are also known to allow leakage if the sealing surface has a roughness of approximately 32 micro-inches or greater.

The invention provides improvements over the prior art relating to seals for filters. These and other advantages of the invention, as well as additional inventive features, will be apparent from the description of the invention provided herein.

BRIEF SUMMARY OF THE INVENTION

In one aspect, the invention provides a filter element. The filter element comprises a first end cap and a second end cap. The filter element further comprises a tubular ring of filter media, which extends between the first and second end caps and around a longitudinal axis. The first end cap carries a gasket, which has an annular sealing flange and an annular base portion. In a first embodiment, the annular sealing flange is spaced radially outside the annular base portion and an outer peripheral surface of the end cap. In an alternative embodiment, the annular sealing flange is spaced radially inside the annular base portion and an inner peripheral surface of the end cap. In either embodiment, the gasket is elastomeric with sufficient resiliency and flexibility to conform and seal to a non-round opening with up to at least 0.01 inch, more preferably up to 0.1 inch, and most preferably 0.25 inch in a diameter variance from round. The gasket also has sufficient resiliency and flexibility to conform to generally round openings having diameters that are up to 0.125 inches outside a design diameter, as well as to surfaces having a surface roughness of up to 90 micro inches. This sealing ability allows a filter to be sealed to imperfectly manufactured sealing surfaces, such as machined or stamped openings in filter housings.

In a preferred embodiment, the annular sealing flange extends at a canted angle of between 10 and 85 degrees relative to the longitudinal axis of the filter. The annular sealing portion thus defines an annular pocket with the annular base portion. In a more preferred embodiment, the gasket has an outer diameter with a design toleranced variance of greater than 1% and up to at least 5%, thus allowing design and lower cost flexibility to the gasket. The gasket is formed from a seal material having a Shore A durometer of between 30 and 80, and an elongation of between 100 and 400. The seal material may be made from a suitable sealing material such as at least one of buna-n (nitrile), fluoropolymer, silicone, fluorosilicone, and EPR (ethylene propylene rubber), although other suitable seal materials are contemplated.

In a more preferred embodiment, the annular base of the gasket has an axial thickness of between 0.1 inches and 0.75 inches, and a radial thickness of between 0.1 inches and 1 inch. The annular sealing flange spans a longitudinal length of between 0.1 inches and 1.25 inches, and spans a radial distance of between 0.1 inches and 1 inch. The annular pocket has a longitudinal depth of between 0.1 inches and 1 inch. It may wedge tightly into and against all three sides of a groove (the sidewalls and the bottom) formed in an end cap for appropriate support.

Also preferably, the filter has an outer diameter of between 2 and 10 inches, and a longitudinal length of between 4 and 80 inches. The filter element has a design maximum differential pressure of at least 50 PSID.

In another preferred embodiment, the first end cap is a plastic open end cap. The first end cap has an annular disc portion surrounding a central flow opening. The first end cap defines an outwardly opening annular groove, which retains the annular base portion of the gasket.

In another embodiment, the annular pocket faces axially toward an end of the filter element that provides the plastic open end cap. The filter element further comprises a porous outer support wrapper surrounding the tubular ring of filter media.

In a preferred embodiment, the gasket is a chevron seal.

In another aspect, the invention provides a filter system. The filter system includes filter element and a housing with an inlet and an outlet, and fluid flows from the inlet to the outlet. The housing further comprises a radial seal housing surface. The filter element comprises a first end cap and a second end cap. The filter element further comprises a tubular ring of filter media, which extends between the first and second end caps and around a longitudinal axis. The first end cap carries a gasket, which has an annular sealing flange and an annular base portion. In a first embodiment, the annular sealing flange is spaced radially outside the annular base portion and an outer peripheral surface of the end cap. In an alternative embodiment, the annular sealing flange is spaced radially inside the annular base portion and an inner peripheral surface of the end cap. In either embodiment, the gasket is elastomeric with sufficient resiliency and flexibility to conform and seal to a non-round opening with up to at least 0.01 inch, more preferably up to 0.1 inch, and most preferably 0.25 inches in a diameter variance from round. The gasket also has sufficient resiliency and flexibility to conform to generally round openings having diameters that are up to 0.125 inches outside a design diameter, as well as to surfaces having a surface roughness of up to 90 micro inches. This sealing ability allows a filter to be sealed to imperfectly manufactured sealing surfaces, such as machined or stamped openings in the filter housing.

Preferably, the housing includes a vessel having an inlet and an outlet. The inlet and outlet are separated by a partition wall having an array of flow openings. A plurality of sleeves are mounted to the partition wall and aligned with the flow openings. Each sleeve defines one of the radial seal surfaces. A plurality of filter elements are arranged in parallel circuit with each other. Each filter element extends at least partly into one of the sleeves, and radially seals thereto.

In yet another aspect, the invention provides a method of replacing a filter element in a filter system. According to this aspect, the filter system has an inlet and an outlet, with fluid flow from the inlet to the outlet. The housing has an original filter element therein with an original endcap carrying an O-ring gasket. The O-ring gasket is sealed against a radial seal housing surface of the housing. One step in the method includes installing a replacement filter element into the housing. The replacement filter element has a first end cap and a second end cap and a tubular ring of filter material extending between the end caps and around a longitudinal axis.

The aspect further includes a step of sealing between the first end cap and the radial seal housing surface. The seal is formed with a gasket having an annular sealing flange and an annular base portion. The annular base portion is carried by the first end cap, and the annular sealing flange extends radially beyond an inner peripheral surface or outer peripheral surface of the first end cap.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
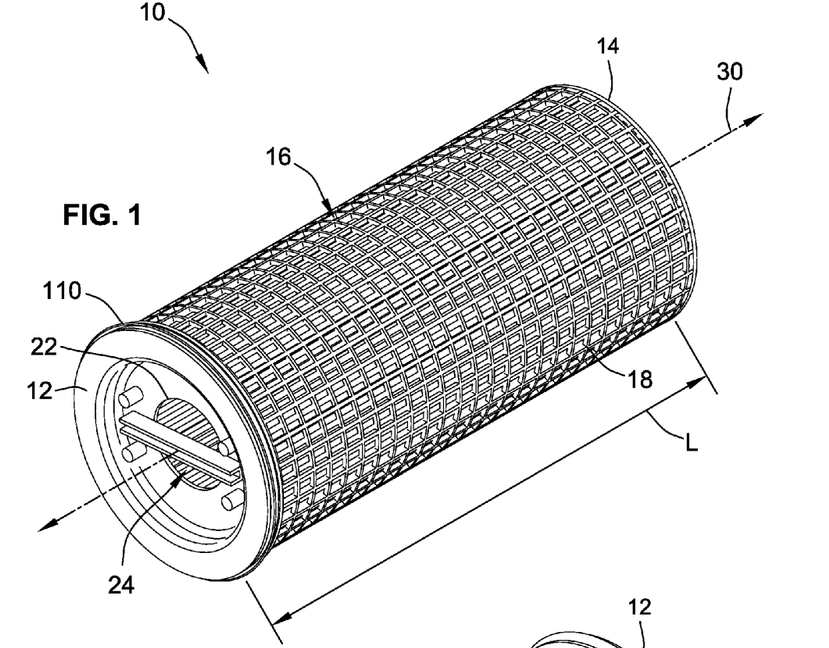
FIGS. 1 and 2 are perspective views of an embodiment of a filter having a chevron seal according to the teachings of the present invention.
Figure 2:
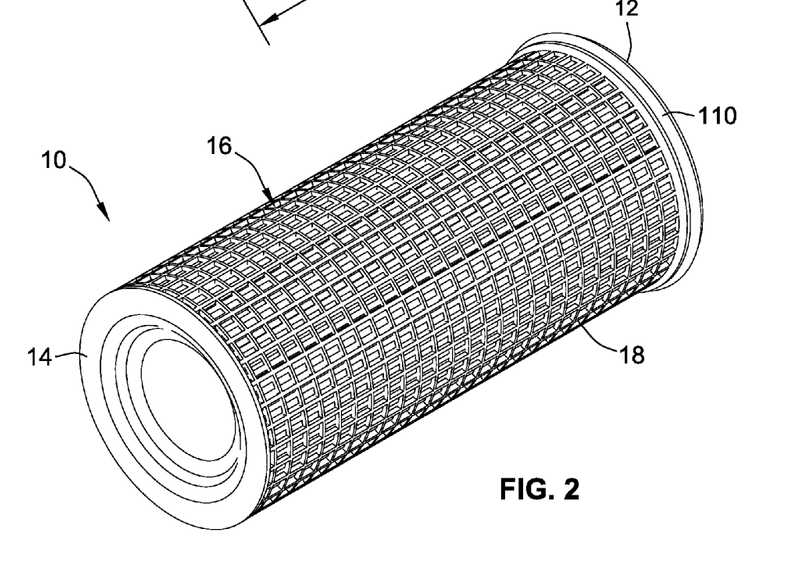

With reference to FIGS. 1 and 2, a filter 10 having seal to accommodate non-round openings is provided (accommodating openings with up to at least 0.01 inch, more preferably up to 0.1 inch, and most preferably 0.25 inches in a diameter variance from round), which may take the form of a chevron seal 110 as discussed in embodiments below. The filter 10 includes an open end cap 12 and a closed end cap 14. Filter media 16 extends between the end caps 12 and 14 and around a longitudinal axis 30 such that the filter 10 is generally hollow and defines an inner cavity 24. In a preferred embodiment, the filter media 16 is a pleated filter media, although other types of filter media are contemplated such as depth media for example. The filter 10 may further include a support wrapper 18, which is made of a suitable porous somewhat-rigid material. The open end cap 12 defines a central flow opening 22 and an outwardly opening annular groove 20 (shown in FIG. 8), which carries the chevron seal 110 (shown in more detail in FIGS. 4-7).

In a preferred embodiment, the outer diameter of the filter 10 is between 2 inches and 10 inches, and the longitudinal length L is between 4 inches and 80 inches. The filter 10 preferably has design maximum differential pressure of at least 50 PSID.

Figure 3:
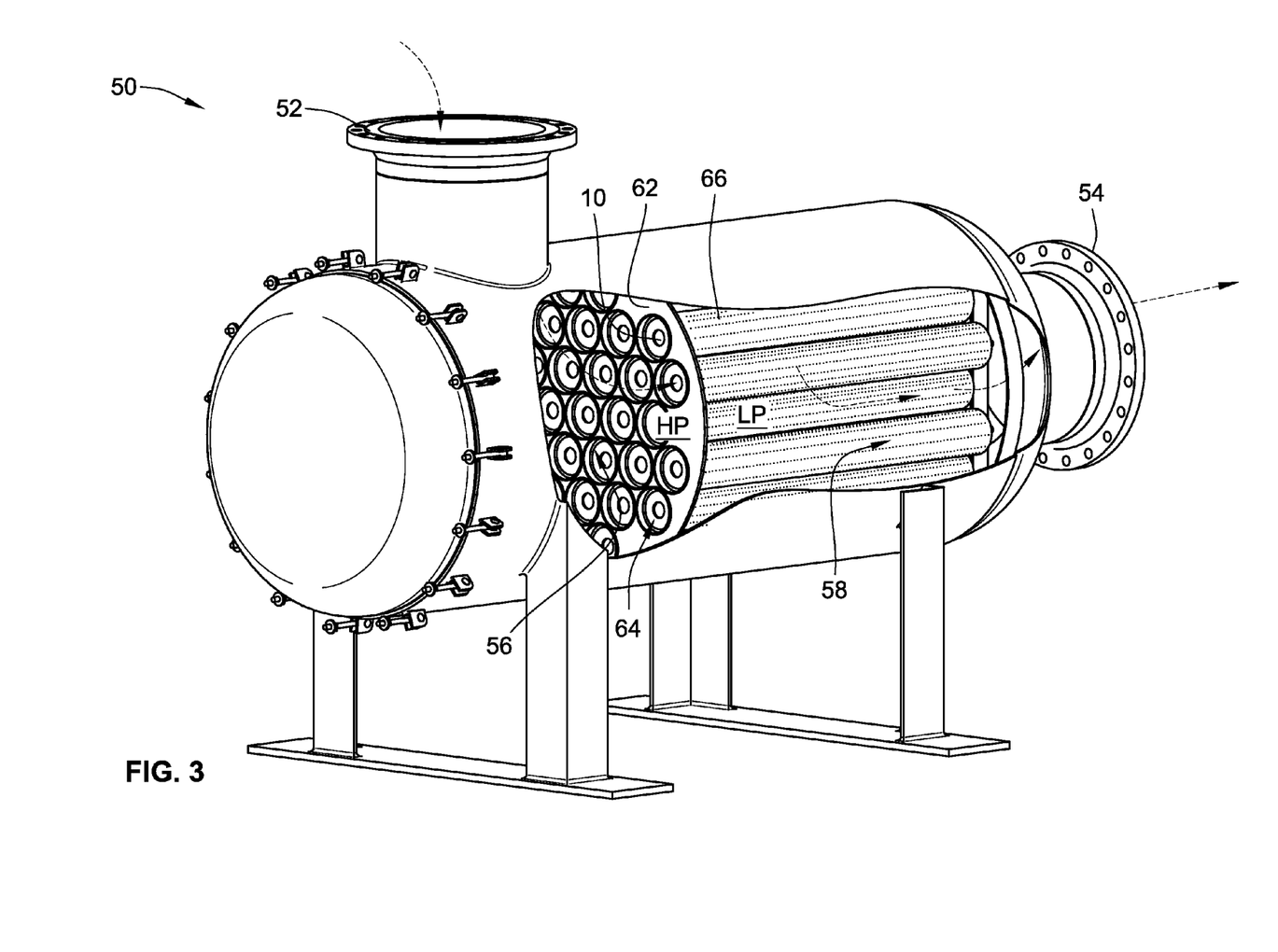
FIG. 3 is a perspective view of an embodiment of the filter of FIG. 1 installed in a filter housing.

Turning now to FIG. 3, one embodiment of the filter 10 having a chevron seal 110 is shown installed in a filter vessel 50. The filter vessel 50 has an inlet 52 and an outlet 54. The filter vessel 50 is separated into an inlet area 56 having a high pressure and an outlet area 58 having a low pressure by a partition wall 62. The partition wall 62 defines various flow openings 64, having sleeves 66 extending therefrom into the outlet area 58. The sleeves 66 are adapted to receive the open end cap 12 of the filter 10 such that the fluid to be filtered flows first into the inlet area 56 through the inlet 52 and then through the flow openings 64 into the filters 10. The contaminated fluid then flows through the filter media 16, and contaminants are attempted to be removed therefrom. The filtered fluid then flows out of the filter media 16, into the outlet area 58, and lastly through the outlet 54. As such, the filters 10 shown in FIG. 3 are configured to filter fluid in an "inside to outside" direction.

Figure 3A:
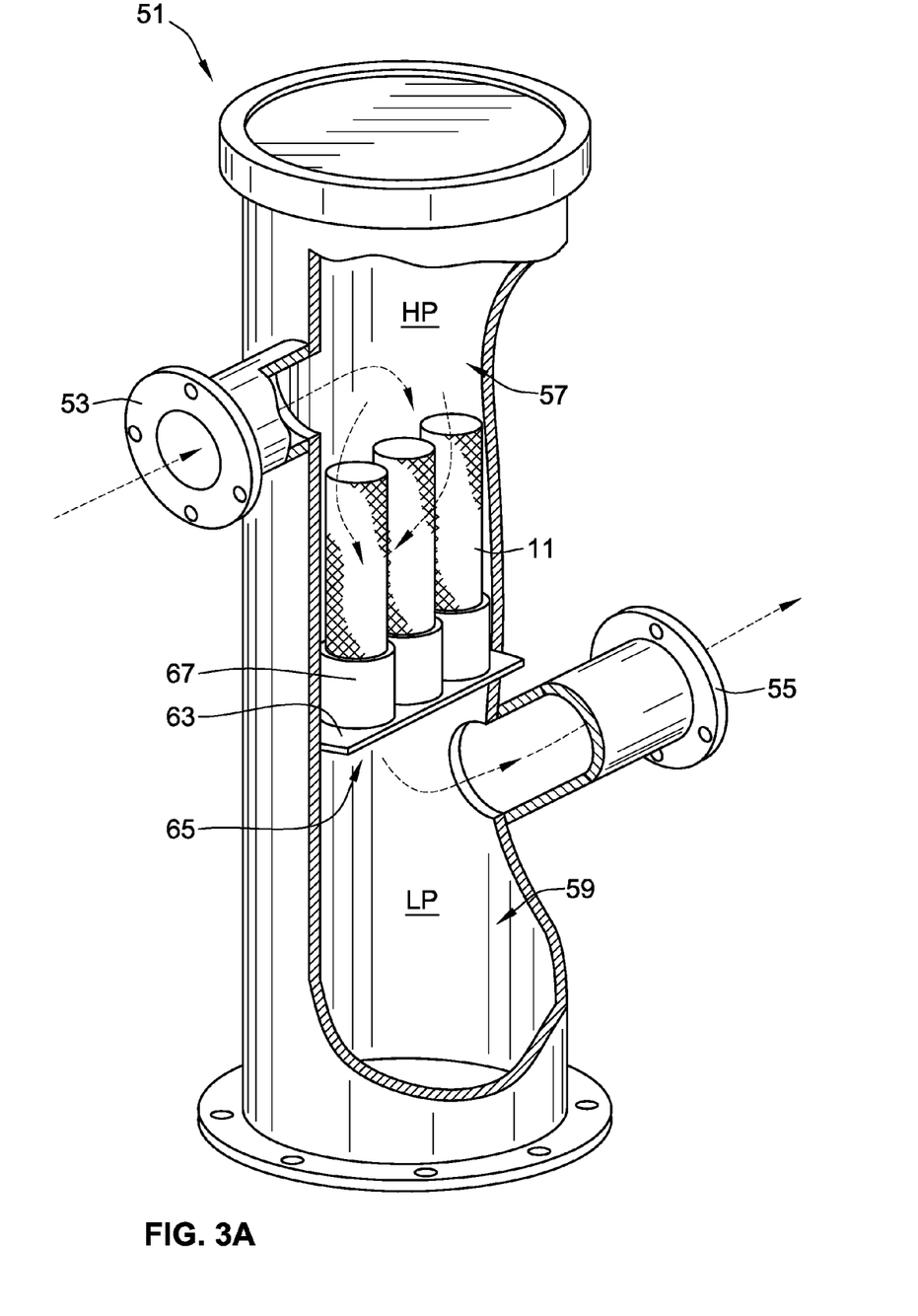
FIG. 3A is a perspective view of an alternative embodiment of the filter of FIG. 1 installed in a filter housing.
Figure 4:
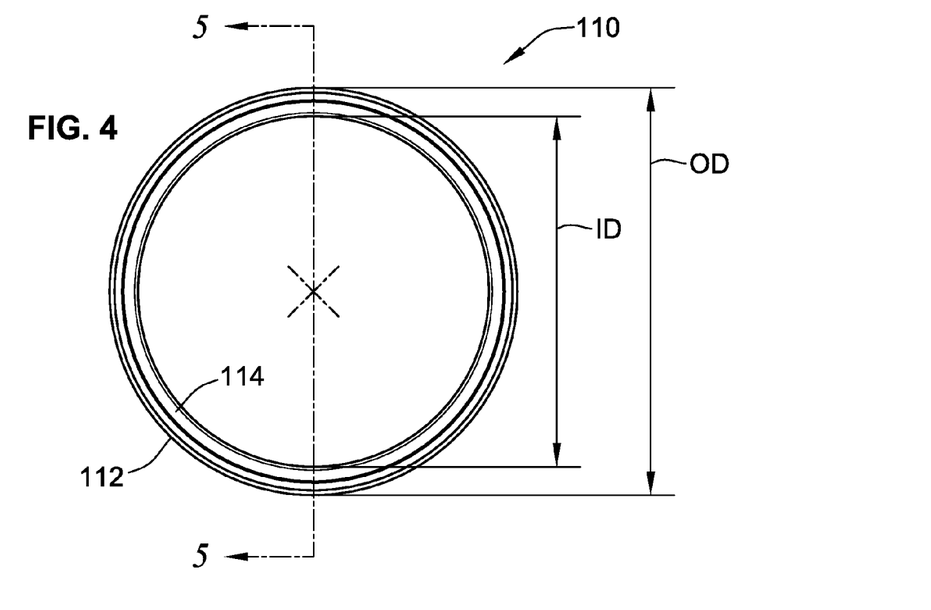
FIGS. 4, 5, and 6 are views of the chevron seal used in the filter of FIG. 1.
Figure 5:
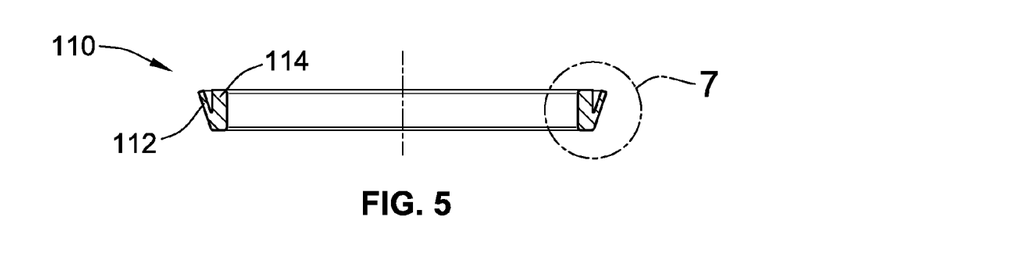
Figure 6:
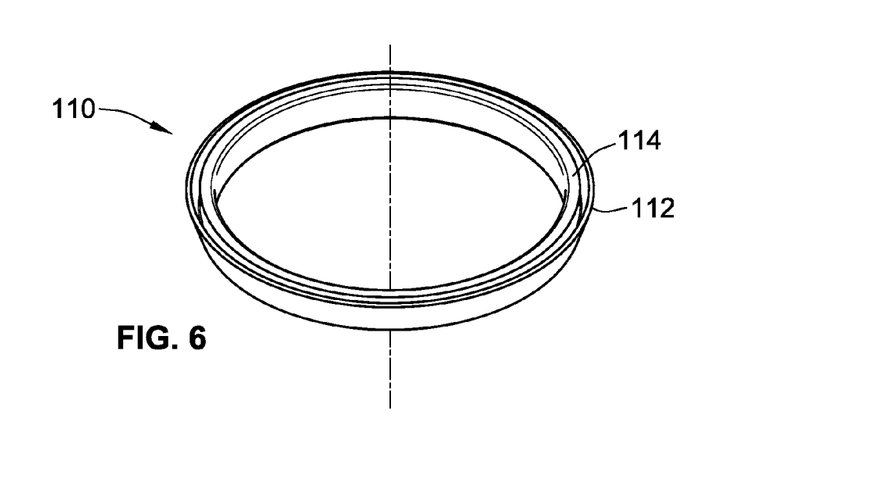
Figure 7:
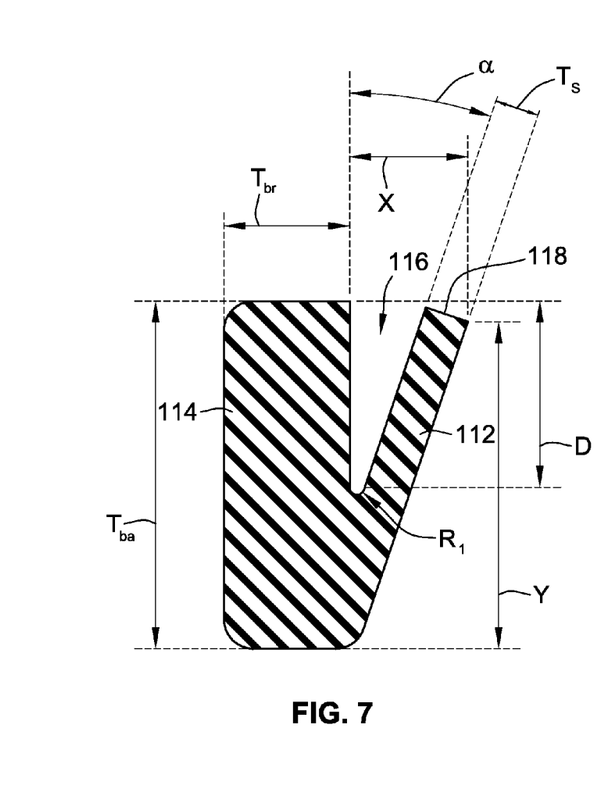
FIG. 7 is a cross-sectional view of the chevron seal of FIGS. 4, 5, and 6.

In other embodiments, such as the filter system shown in FIG. 3A, a filter 11 is adapted to filter fluid in an outside to inside direction. In this embodiment, the fluid flows through an inlet 53 of a vessel 51 into an inlet area 57 having high pressure. The unfiltered fluid then flows through the filter 11, which is received by a sleeve 67. Each sleeve 67 extends from a flow opening 65 in a partition wall 63, which separates the vessel 51 into the inlet area 57 and an outlet area 59. The filtered fluid then flows through a flow opening 65 into the outlet area 59 having low pressure, and through an outlet 55.

Figure 11:
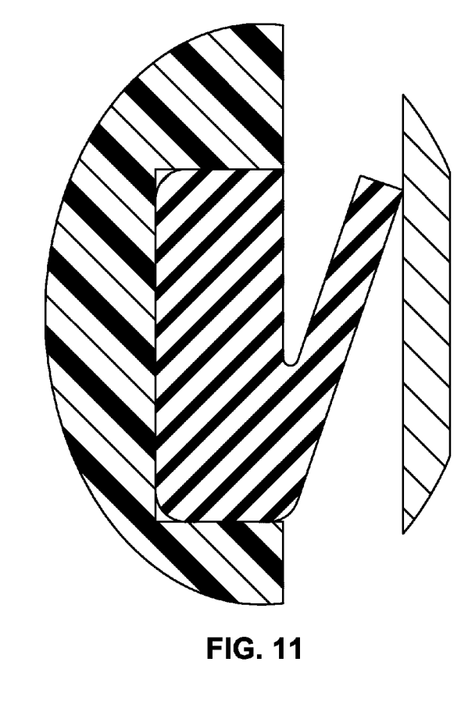
FIG. 11 is a cross-sectional view of the chevron seal of FIG. 8, retained by the filter of FIG. 1.

The chevron seal shown in FIG. 1 is adapted to radially seal the open end cap 12 of the filters 10, 11 to the sleeves 66, 67 such that contaminated fluid in the inlet area 56, 57 cannot bypass the filters. Because the filters 10, 11 may be desired to be used in sealing relation with imperfectly manufactured components, i.e. a sleeve 66 or 67 that is not perfectly round, the filters 10 and 11 having the chevron seal 110 that can seal to a non-round opening is an improvement over seals currently available in the art as applied to filters having end caps. Typically, the chevron seal will be wedged tightly into a groove on the end cap—positively engaging all three sides (sidewalls and groove bottom) when mounted thereon (see FIG. 11). While discussed in association with a chevron seal, it is understood that the embodiments may more generally have a mounting base portion for the end cap (which seals an end of the filter media ring), and a flange (seals even if not "chevron seals" are thus encompassed under broader claimed aspects). However, embodiments discussed herein are typically referred to as chevron seal.

Turning now to FIGS. 4-7, the chevron seal is discussed in greater detail. The chevron seal 110 has an annular sealing flange 112 and an annular base portion 114, defining a pocket 116 therebetween that opens at an angle α.

The chevron seal 110 has an inner diameter I.D. adapted to be retained by the outwardly opening groove 20 of the filter 10. In a preferred embodiment, the chevron seal 110 has a outer diameter O.D. with design tolerance variance of up to 5% of the total outer diameter.

In a preferred embodiment, the annular base portion 114 has an axial thickness Tba of between 0.1 inches and 1.5 inches, and a radial thickness Tbr of between 0.1 inches and 1 inch. The annular sealing portion 112 has a thickness Ts of between 0.02 and 0.25 inches. The terminating end 118 of the annular sealing portion 112 is radially spaced from the annular base portion 114 by a distance X of between 0.1 inches and 1.25 inches. The annular sealing portion 112 spans a longitudinal length Y of between 0.1 inches and 1.25 inches. The angle α of the pocket 116 is between 10 degrees and 85 degrees, and the pocket 116 has an axial depth D of between 0.1 inches and 1 inch.

The chevron seal 110 is preferably made from an appropriate sealing material such as buna-n (nitrile), fluoropolymer, silicone, fluorosilicone, or EPR (ethylene propylene rubber), although other appropriate sealing materials are contemplated. A preferred embodiment of the chevron seal 110 has a Shore A durometer of between 30 and 80.

The preferred characteristics discussed above allow the filter 10 having a chevron seal 110 to form a seal with a non-round opening. A method of measuring a variance from round in an opening involves measuring the maximum and minimum diameters of the opening with a measuring tool such as a set of calipers, and subtracting the minimum diameter from the maximum diameter. The chevron seal 110 is adapted to seal to openings with up to at least 0.25 inches variance from round in preferred embodiments and certainly better than typical O-ring gaskets that may be prone to sealing problems with non-round surfaces as described above.

The preferred characteristics discussed above also allow the filter 10 having a chevron seal 110 to form a seal with a generally round opening that is formed having a diameter that is at least up to 0.125 inches outside a design diameter of the opening (certainly greater than the 0.01 inches that is reliably provided by an o-ring). A filter 10 having a chevron seal 110 can also form a seal with a generally round opening that has a surface roughness of at least up to 90 micro-inches (and greater than the typical—ring maximum roughness of 32 micro-inches). This sealing ability provides significant improvements over an O-ring gasket, which may not be able to form a seal with openings being 0.010 inches out of tolerance, or surfaces with a surface roughness of over 32 micro-inches.

Embodiments of the present invention may thus be set for greater performance than an o-ring with a variance of between 0.01 inches and 0.125 inches or more from a designed diameter of the opening, preferably higher in the range. Embodiments of the present invention may thus also be set to conform to a surface roughness of between 32 micro inches and 90 micro inches or more, and again higher in the range is preferable. This allows for maximum design and manufacturing flexibility.

Figure 8:
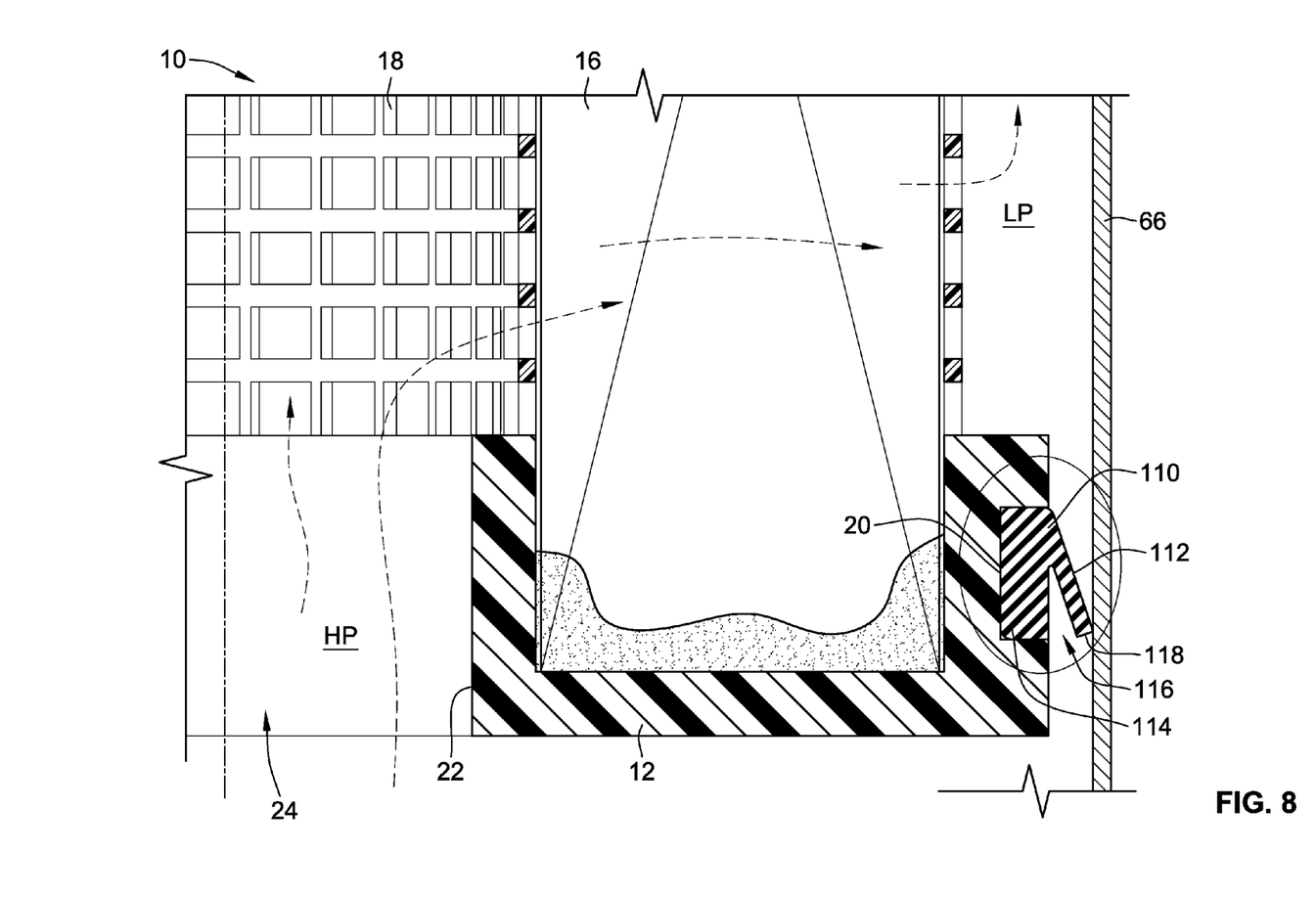
FIG. 8 is a cross-sectional view of the filter having a chevron seal of FIG. 1 installed in the housing of FIG. 3 with a radially outward seal.
Figure 9:
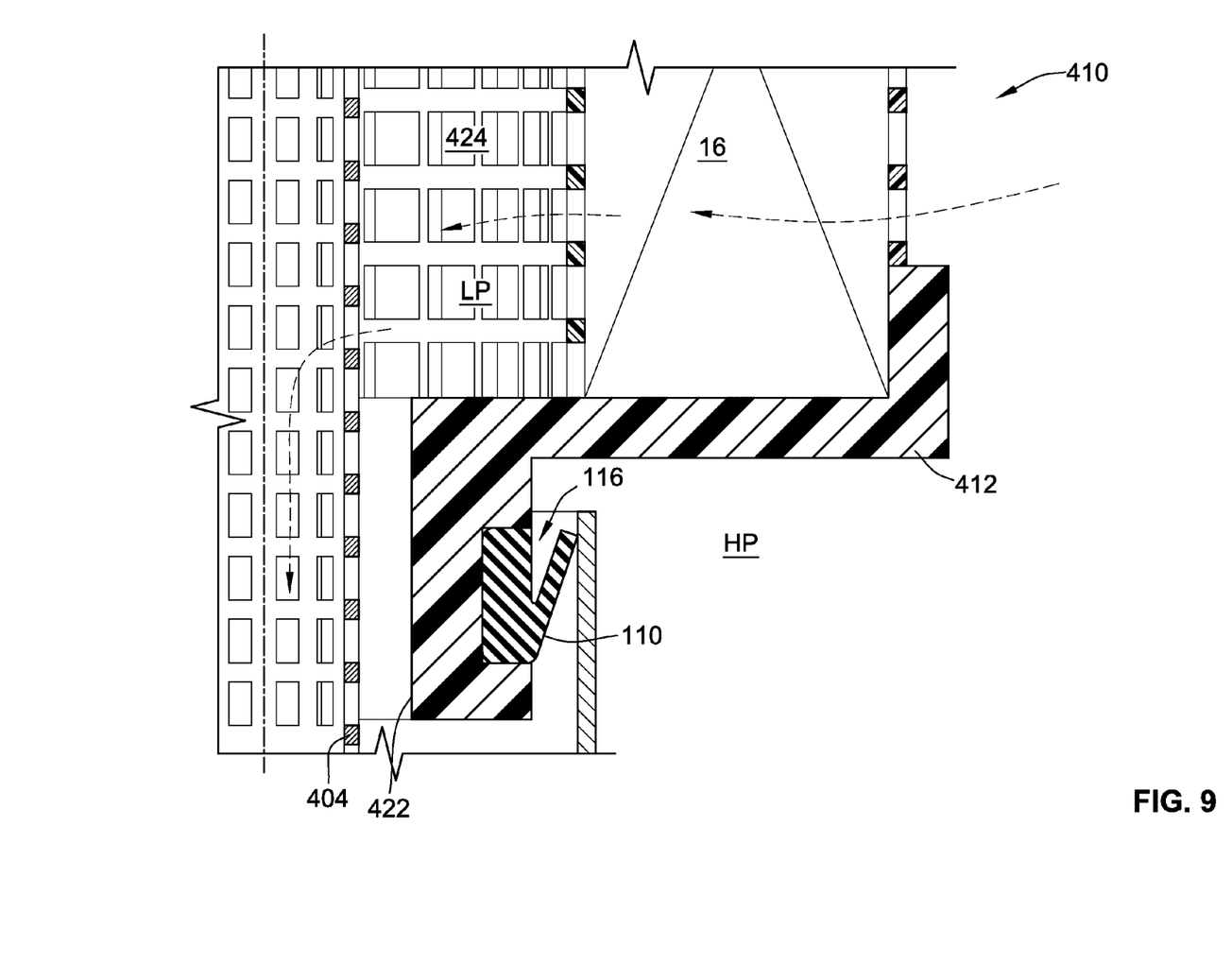
FIG. 9 is a cross-sectional view of an alternative embodiment of a filter having a chevron seal with a radially outward seal.
Figure 10:
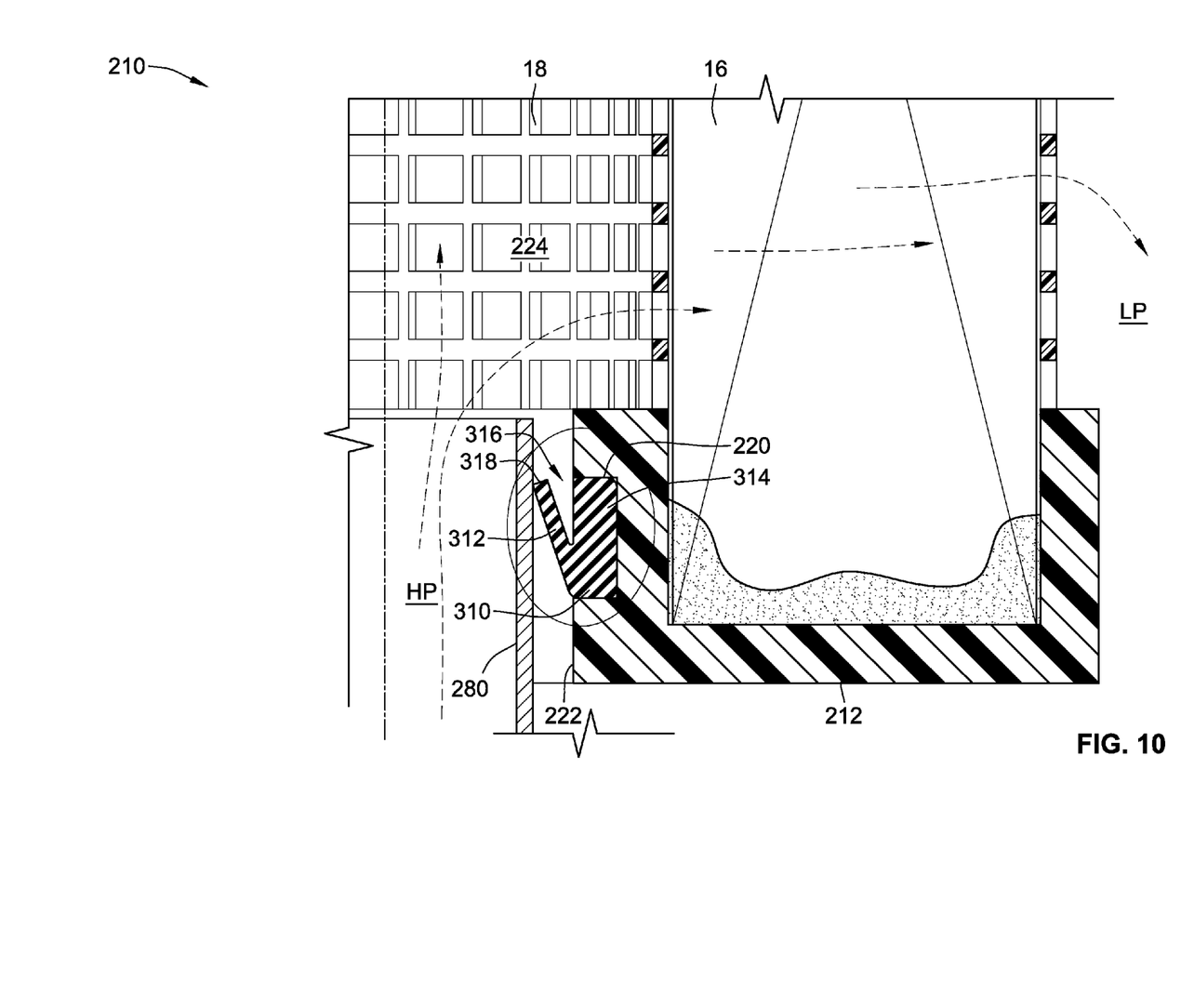
FIG. 10 is a cross-sectional view of an alternative embodiment of a filter having a radially inward chevron seal.

Turning now to FIGS. 8-10, the sealing ability of the chevron seal 110 is further discussed. In a first embodiment, shown in FIG. 8, the open end cap 12 defines the outwardly opening groove 20 on an outer peripheral surface of the end cap 12. The outwardly opening groove 20 retains the annular base portion 114 of the chevron seal 110 such that the annular base portion 114 fits snugly within the groove 20, i.e. the chevron seal 110 is slightly compressed within the groove 20 and thus contacts each of the surfaces of the groove 20.

In the embodiment shown in FIG. 8, the annular terminating end 118 of the chevron seal 110 is spaced radially outside the annular base portion 114. A diameter of an inner peripheral surface of the sleeve 66 is smaller than the outer diameter of the chevron seal 110 and larger than the diameter of the outer peripheral surface of the open end cap 12. As such, when the filter 10 is received within the sleeve 66, the chevron seal 110 is in a radially compressed state.

The pocket 116 of the chevron seal 110 opens toward the high pressure inlet area 56. As such, the high pressure fluid exerts pressure inside the pocket 116 on both the annular sealing portion 112 and the annular base portion 110. This pressure urges the pocket 116 open, causing further radial sealing engagement between the annular sealing portion 112 of the chevron seal 110 and the sleeve 66, as well as between the annular base portion 114 of the chevron seal 110 and the open end cap 12. The radially compressed state of the chevron seal 110 and the beneficial orientation of the pocket 116 helps prevent fluid in the high pressure area from bypassing the filter, even when the inner surface of the sleeve 66 is not perfectly round.

The filter 10 having a chevron seal 110 shown in FIG. 8 is adapted to filter fluid flowing in through its central flow opening 22 and outward through the filter media 16 toward the outer periphery of the filter 10 such that the filter removes contaminants from fluid flowing in an "inside to outside" direction, as illustrated in FIG. 3.

In other embodiments, such as the embodiment illustrated in FIG. 9, a filter 410 having a chevron seal 110 may filter fluid flowing into the filter 410 through the outer periphery of the filter media 16 and out of the filter 410 through the central flow opening 422 in the open end cap 412, in an "outside to inside" direction. In this alternative embodiment, a high pressure inlet area surrounds the outer periphery of the filter 410, and a low pressure outlet area is positioned within the inner cavity 424 of the filter 410. As such, the chevron gasket 110 is oriented such that the pocket 116 opens toward the area having high pressure. In this alternative embodiment, a cross-section of the chevron seal 110 is oriented generally upside down from the orientation illustrated in FIG. 8.

The embodiment illustrated in FIG. 9 may further include a perforated tube 404 that carries the filtered fluid from the inner cavity 424 from the filter 410. Also, this embodiment includes an end cap 412 having a disc portion bonded to the end of the filter medium, and a projecting tube and cylinder portion having a groove to receive the chevron gasket in spaced relation from the axial end of the filter media ring.

In another alternative embodiment, shown in FIG. 10, a filter 210 having a chevron seal 310 is adapted to receive an inlet pipe 280. In this embodiment, the open end cap 212 defines an inwardly opening groove 220 on an inner peripheral surface of the end cap 212. The inwardly opening groove 220 retains the annular base portion 314 of the chevron seal 310 such that the annular base portion 314 is seated snugly within the groove 220. In this alternative embodiment, the annular terminating end 318 is spaced radially inside the annular base portion 314. In this embodiment, an outer diameter of the inlet pipe 280 is larger than an inner diameter of the chevron seal and smaller than a diameter of the inner peripheral surface of the end cap 212. As such, when the inlet pipe 280 is received by the end cap central flow opening 222, the chevron seal 310 is in a compressed state.

Similarly to the embodiment shown in FIG. 8, the embodiment shown in FIG. 10 is also adapted to filter fluid in an "inside to outside" direction. Also similarly to the embodiment of the filter 10 shown in FIG. 8, the pocket 316 opens toward a high pressure area, this time within the inner cavity 224 of the filter 210. As such, high pressure unfiltered fluid urges the pocket 316 open wider, causing further radial sealing engagement between the annular sealing portion 312 of the chevron seal 310 and the inlet pipe 280, as well as between the annular base portion 314 of the chevron seal 310 and the open end cap 212. The radially compressed state of the chevron seal 310 and the beneficial orientation of the pocket 316 helps prevent fluid in the high pressure area from bypassing the filter, even when an outer surface of the inlet pipe 280 is not perfectly round.

Having discussed the structural attributes of several embodiments of the present invention, a method of replacing a filter element 10 having a chevron seal 110 in a filter system will be discussed. Referring to the FIGs. generally, an original filter element having an O-ring gasket is removed from the vessel 50. The filter 10 having a chevron seal 110 is then installed in the vessel 50, such that the chevron seal 110 seals the open end cap 12 to the sleeve 66 of the vessel 50. The filter 10 is positioned such that the pocket 116 of the chevron seal 110 is open toward the high pressure inlet area 56 of the vessel 50.

One particular advantage is using filter elements with a Chevron seal to replace existing elements in the field employing O-ring gaskets (that may be circular or other shape in cross section). Various current applications suffer from leakage and sealing inefficiencies where O-rings are employed. By substituting elements with Chevron gaskets on the end caps, the non-roundness and sealing problems experienced can be eliminated or greatly diminished if there is a serious non-round problem with a given hole (of many holes) in a partition wall.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
    a first end cap and a second end cap and a tubular ring of filter media extending between the end caps and around a longitudinal axis;
    a gasket carried by the first end cap, the gasket having an annular sealing flange and an annular base portion, the annular base portion carried by the first end cap with the annular sealing flange having an annular terminating end spaced either radially inside an inner peripheral surface or radially outside an outer peripheral surface of the first end cap, wherein the gasket is elastomeric with sufficient resiliency and flexibility to conform and seal to a non-round opening with up to at least 0.01 inch in a diameter variance from round,
    wherein the first end cap defines an annular groove, the annular base portion positioned in said annular groove,
    wherein the first end cap is an open end cap having an annular disc sealing a first end of the filter media, the annular disc having a central opening communicating with an internal cavity of the tubular ring of filter media,
    wherein the second end cap is a closed end cap having an annular disc sealing a second end of the filter media for creating radial flow through the tubular ring of filter media.

2. The filter element of claim 1, wherein the gasket conforms to a non-round opening with up to at least 0.1 inch in diameter variance from round, and a surface roughness of greater than 50 micro-inches.

3. The filter element of claim 1, wherein the gasket conforms to a non-round opening with up to at least 0.25 inch in a diameter variance from round.

4. The filter element of claim 1, wherein the gasket has sufficient resiliency and flexibility to conform to a generally round opening having a diameter up to at least 0.125 inches greater than or less than a design diameter of the opening.

5. The filter element of claim 1, wherein the gasket has sufficient resiliency and flexibility to conform to a generally round opening having a surface roughness of greater than 32 micro-inches.

6. The filter element of claim 1, wherein the annular sealing flange extends at a canted angle of between 10 and 85 degrees relative to the longitudinal axis and defines an annular pocket between the annular sealing flange and the annular base portion.

7. The filter element of claim 3, wherein the gasket has the following characteristics:
    the annular terminating end has a design toleranced diameter being selected between 0.5 and 10 inches, with a design toleranced diameter having a tolerance of greater than 1%; and
    the gasket is formed from a seal material having a durometer (Shore A) of between 30 and 80.

8. The filter element of claim 7, wherein the seal material comprises at least one of: buna-n (nitrile), flouropolymer, silicone, flourosilicone, or EPR (ethylene propylene rubber).

9. The filter element of claim 7, wherein the gasket has the following additional characteristics:
    the annular base having an axial thickness between 0.1 and 1.5 inches and a radial thickness of between 0.1 and 1 inch;

the annular sealing flange spanning a longitudinal length of between 0.1 inch and 1.25 inch, and spanning a radial distance of between 0.1 inch and 1.25 inch; and the annular pocket having a longitudinal depth of between 0.1 and 1 inch.

10. The filter element of claim 9, wherein the filter element has the following parameters: an outer diameter of between 2 and 10 inches; and a longitudinal length of between 4 inches and 80 inches, and wherein the filter element has a design maximum differential pressure of at least 50 PSID.

11. A filter system, comprising:
a housing with an inlet and an outlet with flow from the inlet to the outlet and having a radial seal housing surface; and
the filter element of claim 1.

12. A filter element, comprising:
a first end cap and a second end cap and a tubular ring of filter media extending between the end caps and around a longitudinal axis;
a gasket carried by the first end cap, the gasket having an annular sealing flange and an annular base portion, the annular base portion carried by the first end cap with the annular sealing flange having an annular terminating end spaced either radially inside an inner peripheral surface or radially outside an outer peripheral surface of the first end cap, wherein the gasket is elastomeric with sufficient resiliency and flexibility to conform and seal to a non-round opening with up to at least 0.01 inch in a diameter variance from round wherein the first end cap is an open end cap having an annular disc portion surrounding a central flow opening, wherein the end cap defines an outwardly opening annular groove, the annular base of the gasket retained in the groove;
wherein the second end cap is a closed end cap having an annular disc sealing a second end of the filter media, for creating radial flow through the tubular ring of filter media.

13. The filter element of claim 12, wherein an annular pocket between the annular sealing flange and the annular base portion faces axially toward an end of filter element that provides the open end cap, and further comprising a porous outer support wrapper surrounding the tubular ring of filter media, the tubular ring of filter media being a filter tube.

14. The filter element of claim 13, wherein the gasket is a chevron seal.

15. A filter element, comprising:
a first end cap and a second end cap and a tubular ring of filter media extending between the end caps and around a longitudinal axis;
a gasket carried by the first end cap, the gasket having an annular sealing flange and an annular base portion, the annular base portion carried by the first end cap with the annular sealing flange having an annular terminating end spaced either radially inside an inner peripheral surface or radially outside an outer peripheral surface of the first end cap, wherein the gasket is elastomeric with sufficient resiliency and flexibility to conform and seal to a non-round opening with up to at least 0.01 inch in a diameter variance from round:
a housing with an inlet and an outlet with flow from the inlet to the outlet and having a radial seal housing surface, wherein the housing comprises:
a vessel having an inlet and an outlet,
a partition wall having an array of flow openings and dividing the vessel into an inlet side and an outlet side;
a plurality of sleeves mounted to the partition wall, each sleeve defining one of said radial seal housing surface, each sleeve aligned with one of the openings to facilitate flow therethrough, and wherein a plurality of filter elements are arranged in parallel circuit with each other, each filter element extending at least partly into one of the sleeves and radially sealed thereto.

\* \* \* \* \*